United States Patent Office 2,931,726
Patented Apr. 5, 1960

2,931,726
METHOD OF PRODUCING A GROWTH REGULATOR FOR RUMEN ORGANISMS IN TREATMENT OF RUMEN DYSFUNCTIONS

George B. Garner, Columbia, Mo., assignor to Norden Laboratories, Inc., Lincoln, Nebr., a corporation of Delaware No Drawing. Application June 16, 1955
Serial No. 516,027

4 Claims. (Cl. 99—2)

This invention relates to a growth regulator or controlling undesirable or pathogenic organisms of certain types. For example, I have found that certain microorganisms are contaminants of the rumen in ruminant animals and *Pseudomonas aeruginosa* and *Aerobacter aerogenes* are present in rumen dysfunction cases. I have discovered that normally a regulating factor is present in rumen fluids which inhibits the growth of these undesirable organisms or contaminants and that this factor stimulates growth of desirable bacteria which produces the necessary enzymes for cellulose digestion.

Therefore, it is a principal object of the present invention to provide a growth regulator in concentration for use in medication and promotion of the well being and growth of ruminants and other animals. It is also an object to provide a method of preparing the growth regulator in concentration.

Other objects of the invention are, to incorporate the growth regulator in culture media containing rumen microorganisms for decreasing the lag phase or adjustment time of the rumen organisms in such culture; incorporate the growth regulator with dried rumen organisms to stimulate and effect maximum activity in a shorter time when administered to a ruminant animal; to provide improved rumen function in sub-clinical diseases, such as rumen dysfunction, by adding the concentrated growth regulator to the animal's rations; to provide a growth regulator in concentrated form for suppressing or inhibiting growth of pathogenic organisms which produce rumen dysfunction and other diseased conditions in ruminant and other animals; and to provide optimal condition for cellulose digestion thereby promoting growth of animals.

In carrying out the present invention, I have discovered a factor or factors in fresh rumen fluid, its extracts, corn silage, sargo silage, feeds fermented by rumen microorganisms, material obtained from fermentation barrels inoculated with rumen microorganisms, and other similar materials, which tends to inhibit microorganisms that are considered contaminants of the rumen and which increases digestion in ruminants. To my knowledge, previous workers have not reported an antibiotic-like factor in such materials, and the factor is not identical with known antibiotics or growth regulators.

One method of obtaining the growth regulator is to prepare it from rumen material taken from freshly slaughtered animals. This material is strained or pressed to remove the liquid. The liquid material is then centrifuged. The material which has been thrown down is normally utilized for further production of rumen culture as disclosed in the Muhrer application for patent on "Method of Preserving Natural Rumen Microorganisms and Product Which Results Therefrom," Serial Number 349,310, filed April 16, 1953, now Patent No. 2,738,273. The supernatant material in the centrifuging step is decanted and passed through an adsorbing column of an activated carbon at pH 3.5–4.0. The activated carbon may be of the type known under the trade name "Norit–A." The "Norit–A" adsorbs the active factor and permits the balance of the fluid to pass through. The adsorbing column is then eluted with 80% alcohol. The alcohol dissolves the factor from the adsorbing column. The alcoholic eluate may then be concentrated by removal of the alcohol by means of vacuum distillation to leave the product. The product thus obtained has the unique ability to suppress the growth of pathogenic or undesirable bacteria and at the same time, it stimulates the growth of desirable bacteria or those which produce enzymes for cellulose digestion. The extract is free of microorganisms and stable to autoclaving at a pH between 3.5 and 10.

The growth regulator may be used directly for treatment of various cases of rumen dysfunction where rumen contaminants are present. It has been demonstrated to be effective against *Pseudomonas aeruginosa* and *Aerobacter aerogenes* which have been isolated from rumen dysfunction cases.

The growth regulator when added to rumen products of the type including dry rumen microorganisms and cultural nutrients such as carbohydrates, nitrogen containing chemicals, and minerals particularly disclosed in the Lewis E. Harris application for patent on "Combination of Rumen Culture and Culture Nutrients," Serial Number 417,966, and filed March 22, 1954, now abandoned, enhances the value of such products.

It has been determined that the inclusion of the growth regulating factor in the proportion of 0.1 ml. to 11 ml. of culture medium improves the effectiveness of the rumen microorganisms and the lag phase is descreased. That is, the adjustment time of the rumen microorganisms is decreased, consequently, the effective activity reaches maximum in shorter time.

The growth regulator may also be used as a pre-mix concentrate additive to various prepared feeds for ruminants and other animals for improving feed utilization or efficiency.

The effectiveness of the growth regulator has been demonstrated in vitro and proved in vivo. Inhibition of *Micrococcus flavus* was shown by standard plate technique.

Bactericidal or bacteriostatic action against *Pseudomonas aeruginosa* and *Aerobacter aerogenes* by turbidity measurements has also been proven. Cellulose digestion in vitro was enhanced and the lag phase of washed rumen microorganisms was shortened when 0.1 ml. of the factor was added to 11 ml. of the culture medium. The effect on cellulose digestion was checked in the artificial rumen as described by Brooks, Garner, Muhrer, and Pfander (Journal Animal Science, vol. 13, pp. 758–764, 1954), modified by reducing the amounts by one-third and using Rockefeller centrifuge tubes in place of 8-inch sugar tubes.

In one instance, one group of sheep was fed a standard ration to which the growth regulator had been added while another group of sheep was fed the same standard ration without the growth regulator. The control group had a marked decrease in cellulose digestion while the group receiving the growth regulator had an increase in cellulose digestion and made some gains.

The regulating factor may also be obtained from silage such as corn silage, sargo silage, and other fermented materials, and also from feeds fermented by rumen microorganisms. The microogranism growth regulatory factor can be extracted from its fermented source with water, and the solution processed substantially as above described.

For example, when a corn or a sargo silage is used as the starting material, the silage is washed with water to obtain a liquid fermentation material containing the growth regulator. The solid material of the silage is then strained or pressed to remove the liquid fermentation material. The liquid fermentation material thus obtained is then centrifuged to throw down solids. The supernatant material in the centrifuging step is decanted and passed through an adsorbing column of an activated carbon at pH 3.5–4.0. The activated carbon may also be of the type known under the trade name "Norit-A." The activated carbon adsorbs the active factor and permits the balance of the fluid to pass through. The adsorbing column is then eluted with 80% alcohol. The alcohol dissolves the factor from the adsorbing column. The alcoholic eluate may then be concentrated by removal of alcohol by means of vacuum distillation to leave the product.

The discovery has a wide application in practical animal production because of the stimulation of desirable rumen microorganisms and their functions such as cellulose digestion and because of inhibition of undersirable microorganisms causing rumen dysfunction.

What I claim and desire to secure by Letters Patent is:

1. The method of recovering a growth regulator for inhibiting undesirable organisms and stimulating growth of desirable bacteria in the treatment of rumen dysfunction, wherein the starting material of said method is a fermentation product of the class including liquid rumen, liquids of corn and sargo silages, and animal feeds fermented by rumen microorganisms; said method including centrifuging the liquid fermentation material to throw down solid materials contained in the liquid; decanting supernatant material from the liquid; passing the supernatant material in contact with activated carbon to adsorb the growth regulator on the activated carbon; contacting the activated carbon with alcohol to dissolve the growth regulator, and distilling off the alcohol to leave the growth regulator product.

2. The method of recovering a growth regulator for inhibiting undesirable organisms and stimulating growth of desirable bacteria in the reatment of rumen dysfunction, wherein the starting material is liquid rumen; said method including removing liquid content of the rumen; centrifuging the liquid to throw down solid materials contained in the liquid; decanting supernatant material from the liquid; passing the supernatant material in contact with activated carbon to adsorb the growth regulator on the activated carbon; contacting the activated carbon with alcohol to dissolve the growth regulator, and distilling off the alcohol to leave the growth regulator product.

3. The method of recovering a growth regulator for inhibiting undesirable organisms and stimulating growth of desirable bacteria in the treatment of rumen dysfunction, wherein the starting material of said method is a liquid fermentation material from ruminant animal feeds fermented by rumen microorganisms; said method including centrifuging the liquid fermentation material to throw down solid materials contained in the liquid; decanting supernatant material from the liquid; passing the supernatant material in contact with activated carbon to adsorb the growth regulator on the activated carbon; contacting the activated carbon with alcohol to dissolve the growth regulator, and distilling off the alcohol to leave the growth regulator product.

4. The method of recovering a growth regulator for inhibiting undesirable organisms and stimulating growth of desirable bacteria in the treatment of rumen dysfunction, wherein the starting material of said method is a liquid fermentation material from a silage selected from corn and sargo; said method including centrifuging the liquid fermentation material to throw down solid materials contained in the liquid; decanting supernatant material from the liquid; passing the supernatant material in contact with activated carbon to adsorb the growth regulator on the activated carbon; contacting the activated carbon with alcohol to dissolve the growth regulator, and distilling off the alcohol to leave the growth regulator product.

References Cited in the file of this patent

UNITED STATES PATENTS

| | | |
|---|---|---|
| 2,530,416 | Wolf | Nov. 21, 1950 |
| 2,563,794 | Rickes | Aug. 7, 1951 |
| 2,646,386 | Miner | July 21, 1953 |
| 2,700,611 | Jeffreys | Jan. 25, 1955 |

OTHER REFERENCES

Burroughs et al.: Jour. of Animal Science, p. 513, 1950.